April 13, 1937.  H. C. ROBINSON  2,076,672
STOCK QUOTATION SYSTEM
Filed Sept. 11, 1931  7 Sheets-Sheet 1

Fig. 1

Inventor
Harold C. Robinson
Mr Walter Owen
Atty.

April 13, 1937.  H. C. ROBINSON  2,076,672
STOCK QUOTATION SYSTEM
Filed Sept. 11, 1931  7 Sheets-Sheet 7

INVENTOR.
Harold C. Robinson
BY
ATTORNEY.

Patented Apr. 13, 1937

2,076,672

UNITED STATES PATENT OFFICE 2,076,672

STOCK QUOTATION SYSTEM

Harold C. Robinson, Chicago, Ill., assignor, by mesne assignments, to Associated Electric Laboratories, Inc., Chicago, Ill., a corporation of Delaware Application September 11, 1931, Serial No. 562,320

8 Claims. (Cl. 177—353)

The present invention relates to stock-quotation systems, but is concerned more particularly with systems of this kind wherein a central-station transmitter comprising a register sender is employed to transmit stock quotations to a plurality of receivers, each receiver having associated therewith groups of indicating devices to indicate the received stock quotations.

The main object is the production of a new and improved stock-quotation receiver which receives quotations transmitted over a single-conductor telegraph line by means of a start-stop printing-telegraph transmitter operating from the central-station register sender.

The stock-quotation receiver disclosed herein is an improvement on the stock-quotation receiver disclosed in the application of Robinson et al., Serial No. 549,969, filed July 10, 1931, in that only a single incoming line conductor is required by the present receiver in place of the four incoming line conductors required by the receiver in the Robinson et al. application.

General description

As explained in the above-mentioned application of Robinson et al., it is proposed to provide each of a plurality of stock brokers' offices with a mechanical indicating board, with a separate group of indicators on each board for each stock in which the broker is interested, and to furnish receiving indicator-controlling apparatus with each receiving board, all controlled from a common transmitting station.

The present invention has to do with improvements on a receiver operating in a system such as outlined briefly above, and it contains the following outstanding features:

1. In order to insure the proper distribution of the impulses to the register relays of the receiver, a motor-driven impulse distributor similar to the type ordinarily employed in start-stop printing-telegraph systems is provided with sufficient segments for accommodating all register relays of the receiver in a single revolution of the distributor, thereby eliminating, at the same time, the transfer relays ordinarily employed in the receiver to transfer the control to the register relays in turn.

2. In order to avoid the necessity of transmitting a transmitter-identifying or stock-group-selecting impulse incidental to each quotation, the present receiver is arranged so as to enable the line sending time to be reduced by automatically connecting up the receiver sections for operation one after the other in regular sequence, always starting with receiver section one when a new quotation arrives following a pause.

3. According to a further feature, the price-register relays are provided with control contacts which are effective to start the operation of the local sender and to energize the contact pyramid of the stock-range register. As a special starting arrangement, an additional relay is arranged to be operated over an intermediate spacing segment when neither of the first two price relays operates. By this starting arrangement a standard receiving distributor may be employed instead of a special one having local equipment for securing the proper sequence of operations. Moreover, with the starting of the local sender dependent upon the operation of one of the relays of the price-digit register, the local sender is not started in response to the rotation of the distributor when no quotation is being received, thereby eliminating unnecessary wear at the local sender.

4. In order to avoid the possibility of the first price-digit register relay to be operated falling back before the locking circuit can become closed at the start relay of the local sender, the control of the starting and stopping of the local sender has been revised and a stop relay has been added, through the contacts of which locking potential is normally available for the relays of the price-digit registers. In addition, each register relay in the price-digit registers is provided with a contact pair for starting the local sender, thus insuring that no relay will remain locked up if inadvertently actuated by an attendant, as the locking potential is automatically removed responsive to the local sender going through its usual cycle of operation.

5. In order to enable the starting and stopping of the motor generator of the receiver, together with the motor of the distributor and the motor of the local senders to be controlled over the line from the transmitting station, relay apparatus is provided to respond to the operation of the line relay when current is placed on the line at the transmitting station to start the motors in the receiver into operation and to remove them from under immediate control of the line relay; and, in order to again stop the motors at the receiver, arrangements are provided for counting the operations of the distributor during which no energization of the line relay takes place and for stopping the motor generator and the other motors at the receiver following a predetermined number of such revolutions. In this way, the operation of the motor generator is not interfered with in any way during the normal sending operation, but the receiver is automatically shut down responsive to the opening of the line circuit at the transmitter following a line reversal.

Other objects and features of the invention, mainly incidental of those hereinbefore stated, will become apparent upon a further perusal of the specification.

Referring now to the drawings, comprising Figs. 1 to 7, they show a sufficient amount of equipment in a stock-quotation receiver embodying the features of the invention to enable the invention to be understood.

In order for the drawings to be understood best, Figs. 1–4 should be placed in consecutive order, with Figs. 5 and 6 below Figs. 3 and 4, respectively, and Fig. 7 to the right of Fig. 6.

The particular transmitter with which the receiver is intended to operate is in use by the Teleregister Corporation of New York city, New York. Since the present invention is concerned entirely with improvements in the receiver, the details of the transmitter are not shown, but a brief reference will be made in the course of the description to such features thereof as are necessary to an understanding of the receiver.

*Arrangement of the receiver*

As in the above-mentioned Robinson et al. application, the receiver illustrated herein includes two sections, each allotted to a separate one of the two groups into which the stocks are divided for purposes having to do with the transmission and posting of quotations. As much of the apparatus as is considered practicable is common to the two sections.

Figure 1:
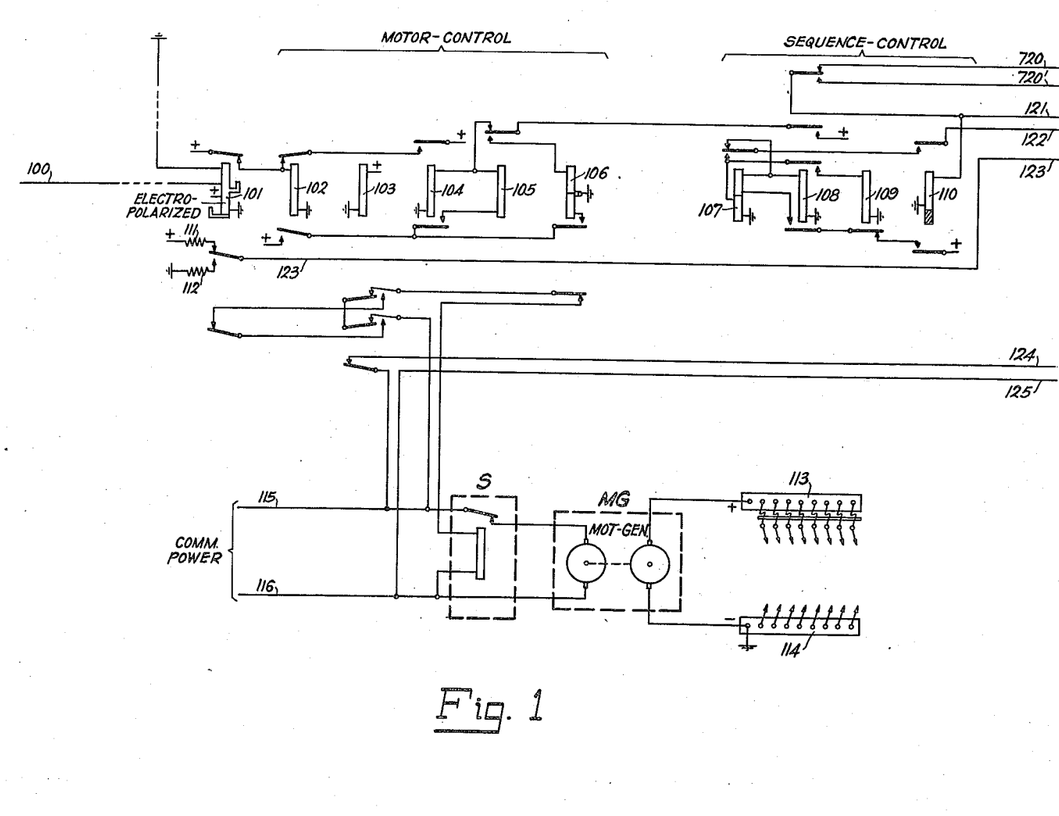
Figure 2:
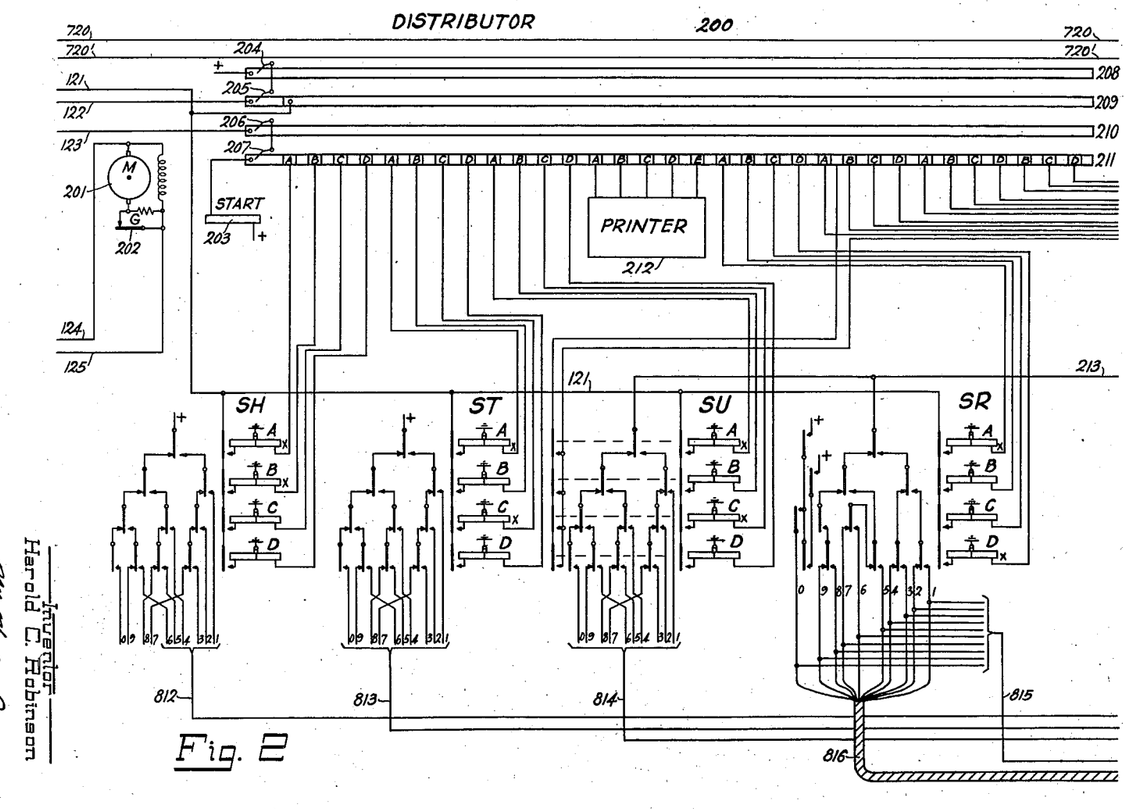
Figure 4:
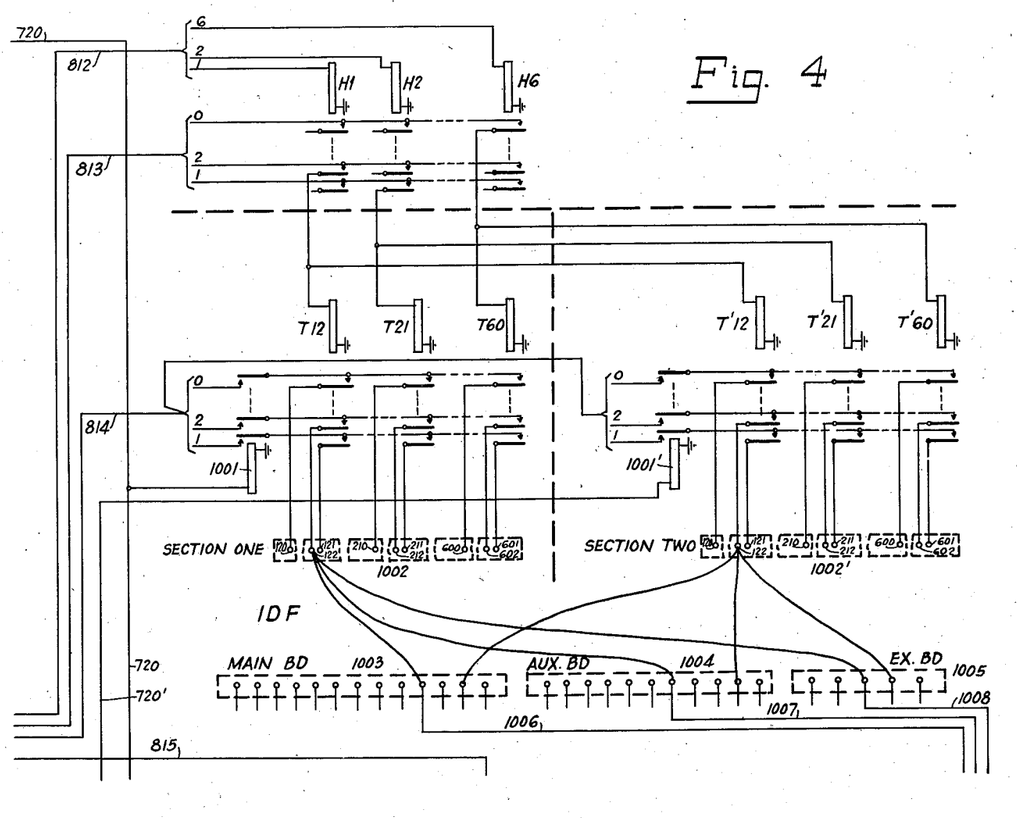
Figure 6:
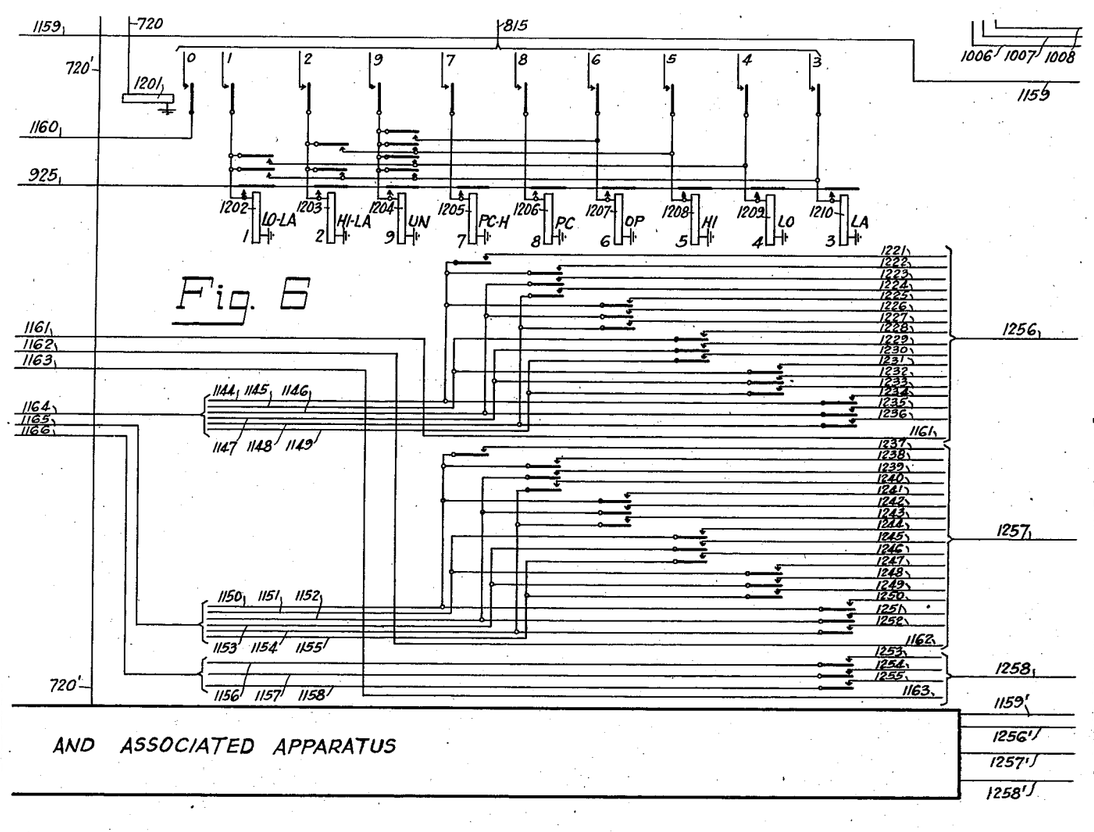
Figure 7:
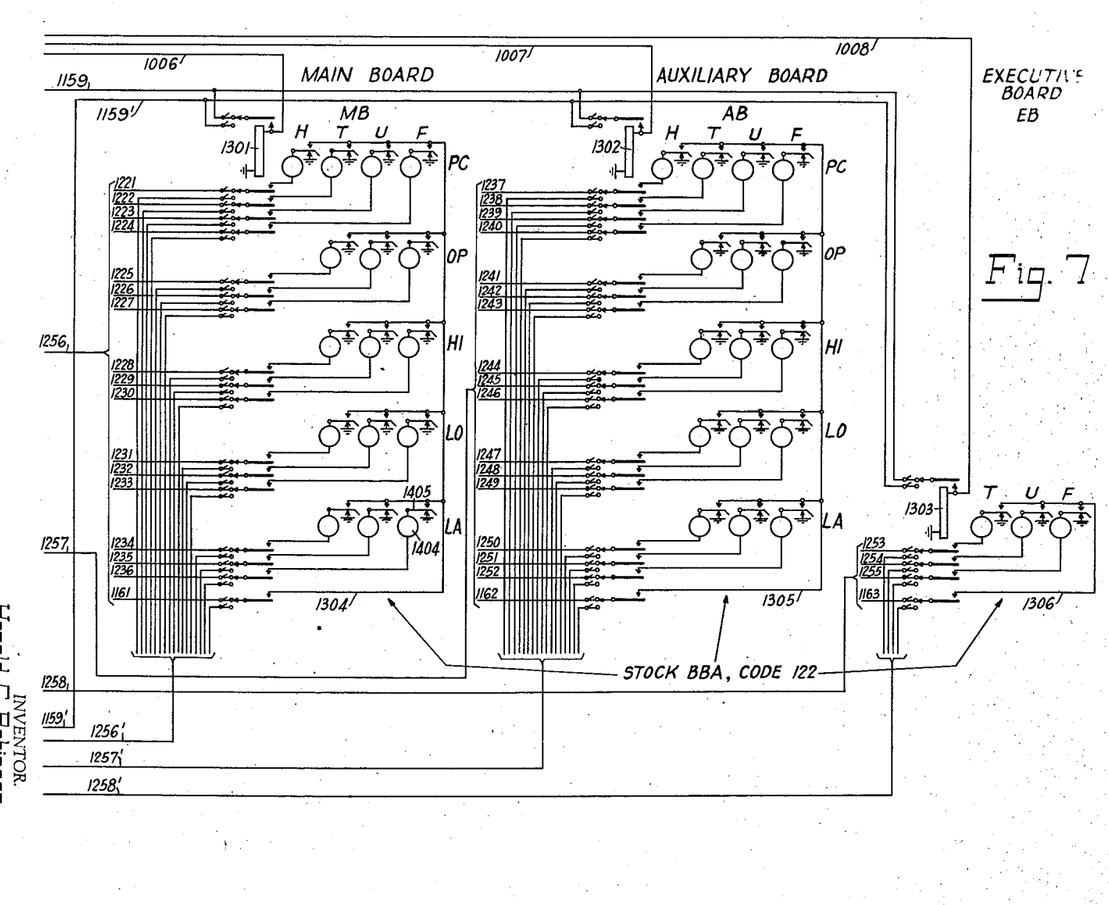

The apparatus of Figs. 1 and 2, together with the relay apparatus at the top of Fig. 4 and the indicating boards of Fig. 7, is common to both receiver sections. The remaining apparatus shown in detail is individual to section 1, while the apparatus individual to section 2 is indicated by the rectangle shown at the bottom of Figs. 5 and 6.

The apparatus of Fig. 1 includes line relay 101, motor-control relays 102—106, sequence relays 107—110, and the motor-generator MG and related power-supply equipment.

The apparatus shown in Fig. 2 includes the receiving distributor 200 and the registers SH, ST, SU, and SR, which record the stock-code digits and stock-range and price-range digits for both sections of the receiver. Each of these registers includes relays A to D, and the registers are associated with separate groups of impulse conductors A to D of distributor 200.

Figure 3:
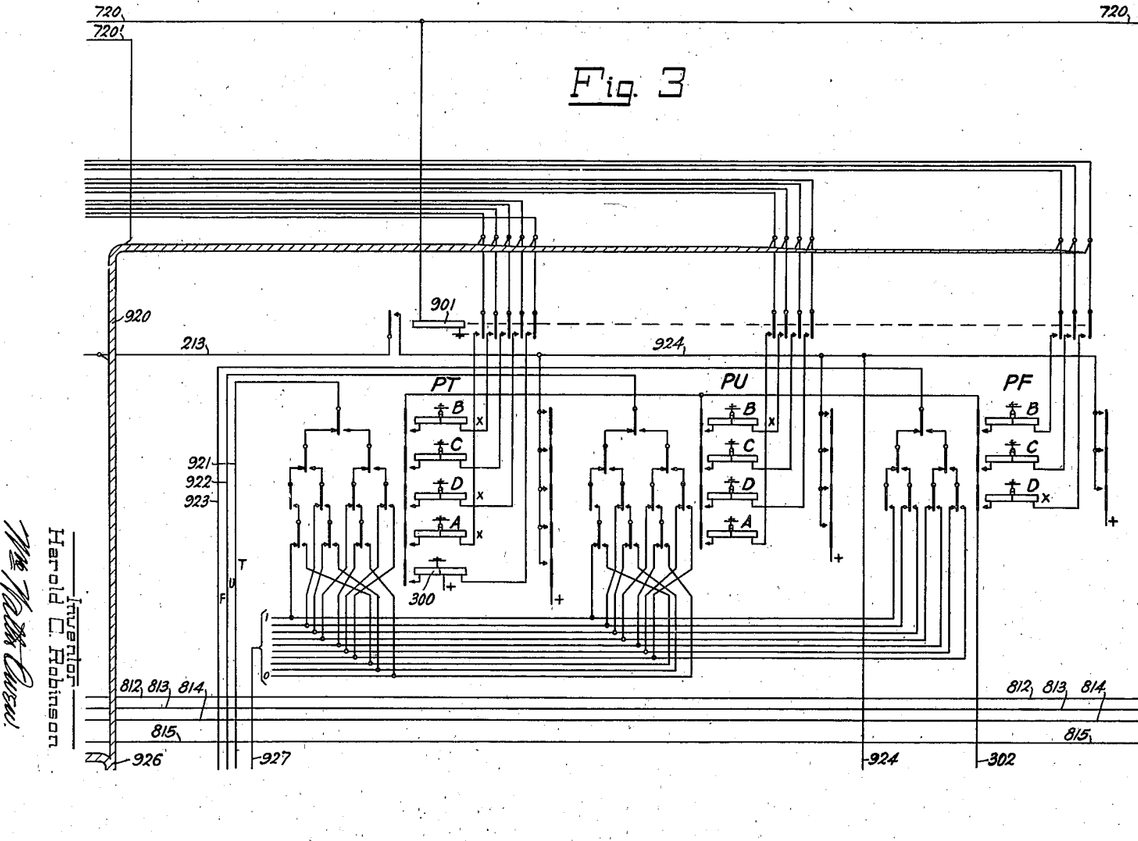

The apparatus shown in Fig. 3 includes the registers PT, PU, and PF which register the price digits when section one of the receiver is in use. These registers are rendered effective whenever the connecting relay 901 is energized under the control of sequence-control relays 107—110, Fig. 1.

The apparatus of Fig. 4 includes the stock-selection relays, together with the intermediate distributing frame IDF and the connecting relays 1001 and 1001'. Of the stock-selection relays, there are six hundreds relays, of which H1, H2, and H6 are shown, and there are sixty tens relays for each section of the receiver, of which the relays T12, T21, and T60 of section one are shown, together with tens relays T'12, T'21, and T'60 of section two. The connecting relay 1001 is operated over conductor 720 to connect up the conductors extending to the contacts of the tens relays of section 1 when the quotation is a channel 1 quotation, and relay 1001' is operated over conductor 720' of the second section whenever the quotation being received is a channel 2 quotation.

Figure 5:
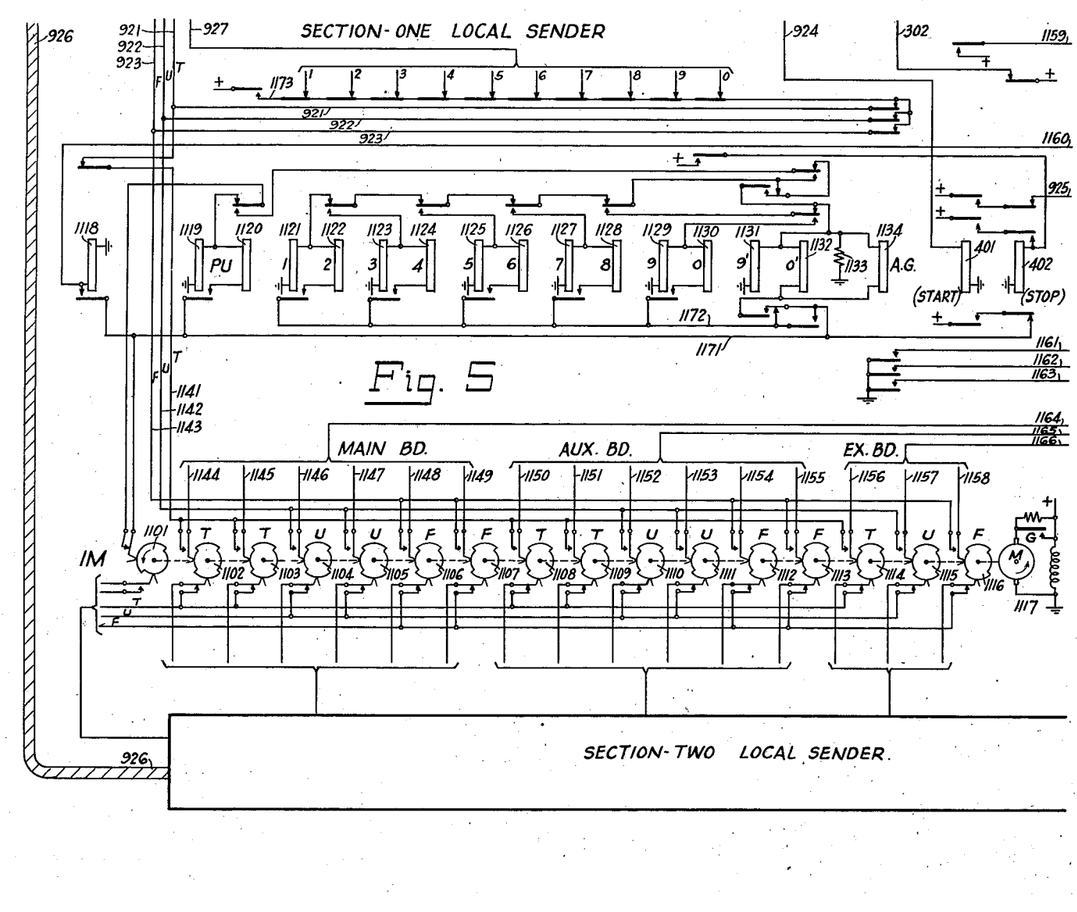

Fig. 5 shows the section-one local sender, comprising relays 1118—1134, 401, and 402, together with the impulse machine IM, operated by motor 1117 and common to both sections of the receiver. The upper set of contacts of the impulse machine IM controls the section-one local sender, while the lower set of contacts controls the section-two local sender.

Fig. 6 shows the stock-range relays 1202—1210, together with the connecting relay 1201, which is operated to connect these relays and price-range relay 1118 of Fig. 5 to the contacts of the relays in the stock-range register SR, Fig. 2, whenever a stock quotation relating to a stock handled by section one is being received. These stock-range relays are operated to determine the row or rows of indicators in a selected stock group to be operated.

Fig. 7 shows the main indicating board MB, the auxiliary indicating board AB, and the indicating board EB, used by executives. Only one stock indicator group and associated stock relay is shown at each board.

It may be pointed out that the connections incoming to the armature springs of the stock relays, the stock relay 1301 for example, are made preferably through jack contacts, so that any stock relay may be inserted into either of two sets of jack contacts to associate it with the multiple of either of the two receiver sections. In this way, any group of indicators may be assigned to any stock in either stock group.

It is to be noted that each of the stock relays, 1301, 1302, and 1303, is shown in association with the stock multiple of section 1. The contacts of the multiple of section 2 are shown just below the contacts of the stock multiple of section 1, and the jack contacts are preferably so arranged that the position of the relay may be shifted only slightly to connect the relays to the multiple contacts of the other section.

The motor generator MG, Fig. 1, obtains power from the incoming commercial power leads 115 and 116, and it supplies current to the receiving apparatus through the bus-bars 113 and 114.

The incoming line conductor 100 passes through the upper winding of the electro-polarized line relay 101 to ground, by way of the line relays of as many other receivers as desired. The line relay 101 is normally operated, and it is restored and reoperated by current reversals when a quotation is being transmitted from the transmitting station to the receiver.

The line relay 101 controls the distributor 200 through the medium of the start magnet 203, which causes the brushes 204 to 207 to make one complete rotation over the brush rings 208—211 each time the magnet is operated. The relays of the registers SH, ST, SU, SR, PT, PU, and PF, Figs. 2 and 3, are controlled through the segments in the ring 211 by line relay 101 to register the digits of the quotations.

The distributor 200 is driven by the motor 201, controlled by governor 202, and may be, for example, similar to the distributor disclosed in the patent to P. M. Rainey, No. 1,311,915, granted August 5, 1919.

Detailed description

The invention having been described generally, a detailed description of the operation of the apparatus shown will now be given. For this purpose it will be assumed that a quotation is received over line 100, and that the quotation is 122—3—041. The digits 1, 2, and 2 of this quotation are the stock-code digits, and they are to be registered on the stock-hundreds, stock-tens, and stock-units registers, SH, ST, and SU, Fig. 2; the digit 3 is the stock-range digit and it is to be registered on the stock-range register SR; and the digits 0, 4, and 1 are the price-tens, price-units, and price-fractions digits, and they are to be registered on the registers PT, PU, and PF, Fig. 3.

Receiving the quotation 122—3—041

It will be assumed that the quotation 122—3—041 is received at the end of an idle line period, and that it is a quotation pertaining to section one of the receiver, in which case it is sent out by the transmitting station as the first quotation following a pause, as the receiver is arranged to set up in section one the first quotation received following a pause.

Starting the distributor

When the line current is reversed over line 100 at the sending distributor, the electro-polarized line relay 101 restores, opening the circuit of relay 102 at its upper armature. At its inner-lower armature, relay 101 disconnects the control conductor 123 from positive potential through resistance element 111 and connects it to negative, or ground, potential by way of resistance element 112, thereby closing an energizing circuit for start magnet 203 of the distributor 200. The start magnet now energizes and releases the brushes 204—207 so that they are driven over the rings 208—211 of the distributor by the distributor motor 201.

When the brush 207 leaves the normal segment, it opens the circuit of start magnet 203 in case the line relay 101 has not already done so, whereupon the start magnet deenergizes, but the brushes continue to travel until they make one complete revolution, having been released by the start magnet.

Brush 205 energizes the locking conductor 121 when it comes into engagement with the long, off-normal segment of ring 209, thereby preparing locking circuits for the register relays of Fig. 2. The placing of energizing potential on conductor 121 also extends energizing potential through the contacts of relay 108 to conductor 720, in addition to energizing the slow-releasing relay 110 to prepare operating and locking circuits for relays 107—109.

Connecting up section one

When conductor 720 is energized upon brush 205 engaging the off-normal segment of ring 209, the connecting relays of section one, including connecting relay 901, Fig. 3, 1001 of Fig. 4, and 1201 of Fig. 6, operate to connect up section one of the receiver for operation.

Setting up the quotation digits

As the brush 207 passes over the off-normal segments in ring 211, it contacts with each of the register relays of Figs. 2 and 3 in turn, thereby bringing all of these relays under the control of line relay 101, successively. The transmitter is arranged to reverse the current flow in conductor 100 back to normal and bring about the reoperation of relay 101 each time brush 207 is in engagement with a register relay required to be operated to register the instant quotation, relay 101 being restored at all other times during the travel of the brushes. Relays A and B of the stock-hundreds register SH are operated to register the first stock-code digit, 1; the relays A and C of the stock-tens register ST are operated to record the second stock-code digit, 2; the relays A and C of the stock-units register SU are operated to record the third stock-code digit, 2; relays A and D of the stock-range register SR are energized to record the stock-range digit, 3; relays A, B, and D of the price-tens register PT are operated to record the price-tens digit, 0; relay B of the price-units register PU is operated to record the price-units digit, 4; and relay D of the price-fractions register PF is operated to record the price-fractions digit, 1.

It is to be noted that the operated relays in registers SH, ST, SU, and SR close locking circuits for themselves to conductor 121, energized by way of brushes 204 and 205 and the off-normal segment of ring 209, while the energized ones of the relays in registers PT, PU, and PF close locking circuits for themselves by way of locking conductor 302, normally energized through the upper contacts of stop relay 402, Fig. 5.

Stock selection

The way in which the group of indicators corresponding to the stock with which the instant quotation is identified is selected will now be pointed out.

It is assumed that there are approximately twelve-hundred stocks being handled by the present stock-quotation system, and that they are about equally distributed between the two channels, and consequently between the two receiver sections. As a result, each receiver section must provide for the selection of any one of six-hundred stocks, although only a small portion of the total number is ordinarily subscribed to by any one broker.

Since energizing potential is normally connected to the apexes of the contact pyramids associated with the registers SH and ST, the stock-hundreds and stock-tens selection relays are appropriately operated over conductor groups 812 and 813 as soon as the first two digits of the quotation have been received. As soon as the first relay of the price-tens register PT operates (relay A in this case), an energizing potential is placed at the right-hand contacts of the relay on conductor 924, closing prepared circuits by way of contacts of relay 901 and conductor 213, later described.

When the stock-hundreds digit 1 is registered on the stock-hundreds register SH, Fig. 2, wherein relays A and B are operated, positive potential is extended through contacts of relays A and B to the associated digit-1 conductor, closing a circuit for relay H1, Fig. 4. It is to be noted that only six of the ten digit-conductors of the stock-hundred register SH are extended to hundreds relays such as relays H1, H2, and H6, as indicated by the double-bracketed line 812 extending from the stock-hundreds register SH, Fig. 2, across the sheet on which Fig. 3 is drawn to the hundreds relays of Fig. 4. When relay H1 operates, it connects the digit conductors 1—0 represented by the double-bracketed line 813 of the stock-tens register ST, Fig. 2 to the associated tens relays in hundreds group 1, of which the tens relay T12 of section 1 and the corresponding tens relay T'12 of section 2 are shown.

When the stock-tens digit 2 is registered on the stock-tens register ST, Fig. 2, wherein relays A and C are operated, relays A and C place a positive potential on the associated digit-2 conductor, closing a circuit through contacts of relay H1, Fig. 4, for the tens relay T12. Relay T12 thereupon operates and connects the ten units conductors 1—0 to ten corresponding terminals on the section 1 jumper block, 1002, of which terminals numbered 121, 122, and 120 are shown. At the same time, relay T'12 of section 2 is operated in multiple with relay T12, but its operation is of no concern at this time, as the connecting relay 1001' of section 2 is not at this time energized.

When conductor 213 is energized as above mentioned, the stock-units digit 2 having been registered on the stock-units register SU, Fig. 2, a positive potential is extended by way of contacts of operated relays A and C to the associated digit-2 conductor, the positive operating potential extending further through contacts of relays 1001 and T12 to terminal 122 on the terminal block 1002 of the intermediate distributing frame IDF. It is assumed that the stock BBA (concerning which the present quotation is being transmitted) is a stock the quotations of which are to be indicated on the auxiliary board and the executive board, in addition to the main board. Accordingly, three jumpers extend from terminal 122 of block 1002, one jumper extending to the terminal in block 1003 of the main board which terminates conductor 1006; another jumper extends to the terminal on block 1004 of the auxiliary board which terminates conductor 1007; and the third jumper extends to the terminal on block 1005 of the executive board which terminates conductor 1008. As a result, stock relays 1301, 1302, and 1303, Fig. 7, located on the main, auxiliary, and executive boards, respectively, operate over conductors 1006—1008 responsive to the potential placed on terminal 122 of block 1002. Upon operating, each relay closes a locking circuit for itself to the locking conductor 1159, which is energized upon the operation of start relay 401, as will be pointed out in detail hereinafter.

*Selecting the stock range*

With relays A and D energized in the stock-range register SR in response to the receipt of the stock-range digit 3, corresponding to the last price in tens, units, and fractions digits, the associated digit-3 conductor is connected up through contacts of relays A and D, which are operated, and through contacts of the unoperated relay B. The circuit for energizing the digit-3 conductor of the register SR includes the above-mentioned energizing conductor 213.

With the digit-3 conductor associated with the stock-range register SR energized, a circuit is closed through contacts of the section-one connecting relay 1201, Fig. 6, for the last-price (LA) relay 1210. Relay 1210 operates and closes a locking circuit for itself to conductor 925, controlled by start and stop relays 401 and 402.

*Starting the local sender*

As a further result of the placing of an energizing potential upon start conductor 924 at the price-tens register PT, start relay 401, Fig. 5, operates and energizes locking conductors 1159 and 925 at its upper armature and at its middle-upper armature, respectively; prepares a locking circuit for stop relay 402 at its inner-upper armature; and at its lower armature it places a potential on conductor 1171 through contacts of stop relay 402, thereby starting the local sender into operation. The local sender now proceeds to transmit the restoration impulses and to transmit the resetting impulses under the control of the registers PT, PU, and PF, as will now be explained.

*Restoring the selected indicators*

With the last-price range relay 1210 operated, and with stock relays 1301—1303 operated, the last-price indicators of stock BBA have been selected on the three indicating boards, Fig. 7. The next operation to be performed is the restoration of the selected indicators to blank position, which operation is performed as follows:

When operating potential is placed on conductor 1171 by start relay 401 as above pointed out, an operating circuit is prepared for pick-up relays 1119 and 1120 by way of the upper contacts of cam 1101. Then, as soon as these contacts close, relay 1119 operates and locks itself to conductor 1171 in series with relay 1120. Relay 1120 does not operate for the time being because it is supplied with the same potential at both terminals. When the upper contacts of cam 1101 separate, however, the initial circuit of relay 1119 is opened, whereupon relay 1120 operates in series with relay 1109 and shifts the upper contacts of cam 1101 from in association with relays 1119 and 1120 into association with relays 1121 and 1122, by way of contacts of relays 1132, 1128, 1126, 1124, and 1122. As a further result of its operation, relay 1120 applies operating potential to conductor 1173, which potential is extended through contacts of relay 1134 to the tens, units, and fractions operating conductors 921, 922, and 923. Since conductors 921—923 are connected to conductors 1141—1143, the operating potential is now extended to the upper contacts of each of the cams 1102—1116. These cam contacts, therefore, send impulses over conductors 1144—1158 to the three indicator boards of Fig. 7 by way of contacts of the operated stock-range relay and stock relays. Since only the last-price relay 1210, Fig. 6, is operated, only conductors 1144, 1146, and 1148 of the impulse group pertaining to the main board are connected through, and these are connected through to conductors 1234, 1235, and 1236. The impulses transmitted over conductors 1234—1236 pass through contacts of the operated stock relay 1301 to the tens, units, and fractions indicators in the bottom row (LA). As will be explained more in detail hereinafter, ten restoration impulses are transmitted over conductors 1234—1236, which is a sufficient number to advance an indicator from any position to blank position. The indicators cannot advance beyond blank position while the restoring impulses are being transmitted, as the cam springs such as spring 1405 shift the return circuit for the indicator from ground to the normally ungrounded actuating-ground conductor 1304. Accordingly, the last-price indicators of stock BBA, code 122, of the main board MB are restored to blank position. At the same time, the impulses transmitted over conductors 1150, 1152, and 1154, specific to the auxiliary board, pass through contacts of the last-price relay 1210 and by way of conductors 1250—1252 and through contacts of the stock relay 1302 to the last-price indicators of stock BBA on the auxiliary board AB, restoring all of these indicators to blank position. In addition, the ten restoring impulses transmitted over conductors 1156—1158, individual to the executive board, pass through contacts of the last-price range relay 1210, over conductors 1253—1255, and through contacts of stock relay 1303 to the indicators of stock BBA on the executive board EB. These impulses restore these three indicators to blank position.

The indicators used to display the price digits are assumed to be of the type shown in Figs. 13 and 14 of British Patent 368,369, complete accepted March 1, 1932. Each indicator has a digit-display drum actuated step-by-step by its associated stepping magnet. A cam carried on a shaft with the drum controls the illustrated cam springs to shift the return circuit from ground to an actuating ground conductor such as 1304, 1305, or 1306 when the drum is in normal (blank) position.

The actuating-ground conductors are ungrounded during the transmission of the restoration impulses; and, as a result, each stock indicator being restored, upon arriving in blank position, is unable to move further because its magnet circuit is shifted over to an ungrounded actuating conductor.

As will be hereinafter pointed out, when the resetting impulses are to be transmitted, the actuating ground conductor is connected to ground by the local sender, providing a ground return circuit to advance the indicators from blank position.

Counting the restoration impulses

The way in which the restoration impulses are counted by the operation of relays 1 to 8, 9', and 0' (1121—1128, 1131, and 1132) will now be pointed out. It is to be noted that the upper contacts of cam 1101 become closed just as the remaining cams 1102—1116 are opening the upper sending contacts, that the contacts of cam 1101 are again opened just as the cams 1102—1116 are again opening their upper contacts, and that an impulse is sent, therefore, over each of the conductors 1144—1158 during each closed portion of the upper contacts of cam 1101, as well as during each open portion of the cam. As a result, each of the cams 1102—1116 transmits twice as many impulses as the cam 1101, and ten restoring impulses are transmitted by the cams 1102—1116 by the time five impulses have been transmitted to the counting relays of the local sender, following the operation of relay 1120 at the termination of the pick-up impulse. Relays 1121, 1123, 1125, 1127, and 1131 operate responsive to the beginning of the first, second, third, fourth, and fifth impulses from cam 1101, respectively, and the relays 1122, 1124, 1126, 1128, and 1132 operate at the end of the first, second, third, fourth, and fifth impulses, respectively. The relays 1121—1128 are locked to conductor 1172, which is connected to locking conductor 1171 through contacts of relay 1131. Now, when relay 1131 operates at the beginning of the fifth impulse delivered by the upper contact of cam 1101 following the operation of pick-up relays 1119 and 1120, it locks itself to the incoming impulse conductor controlled by the upper contacts of cam 1101 and over a circuit path which is independent of the contacts of relay 1128, at the same time opening the connection between the armature of relay 1128 and the impulse conductor. At its lower armature, relay 1131 locks itself to conductor 1171 in series with relay 1132, at the same time disconnecting conductor 1172 from conductor 1171. When this occurs, relays 1121—1128 all fall back, preparatory to being reoperated to count the resetting impulses.

At the termination of the impulse which operates relay 1131, relay 1132 operates in series with relay 1131 and again places locking potential on conductor 1172 by means of its lower contacts; at its inner-upper armature it prepares to operate relay 1129 instead of relay 1131 upon the second operation of the counting chain; and at its upper armature it disconnects the impulse conductor from the junction of its own winding and that of relay 1131, at the same time extending it through contacts of relays 1128, 1126, and 1124 to relays 1121 and 1122 again.

By this time, ten restoration impulses have been transmitted to the selected indicators over the paths pointed out, restoring them all to blank position.

Resetting the restored indicators

The way in which the restored indicators are reset to the respective positions designated by the digits registered on the price registers (PT, PU, and PF) of Fig. 3 will now be explained. Upon referring again to the section-one local sender of Fig. 5, it will be noted that the actuating-ground relay 1134 is operated in multiple with relay 1132, when relay 1132 operates at the end of the tenth restoring impulse. It is to be noted that the resistance element 1133 is shunted around relay 1131, thereby furnishing additional current for operating relay 1134 in multiple with relay 1132. At its three upper armatures, relay 1134 disconnects the tens, units, and fractions conductors 921, 922, and 923 from the conductor 1173, energized at the upper contacts of pick-up relay 1120. By this arrangement, the current-supply for the impulse-sending contacts of the impulse machine IM is restricted to the digit conductors 1 to 0 controlled by the upper contacts of relays 1121—1130 and multiplied to the bases of the contact pyramids of the price registers of Fig. 9. At its three lower armatures, relay 1134 places actuating-ground potential on conductors 1161—1163, extending to the main, auxiliary, and executive boards, respectively. The placing of ground potential on these conductors provides a ground return circuit for the last-price indicators of Fig. 7 which have been shifted into connection with branch conductors 1304, 1305, and 1306, branches of conductors 1161, 1162, and 1163, respectively.

Following the transmission of the ten restoration impulses, the resetting impulses are started without any pause between the two groups other than the regular inter-impulse time interval, as determined by the shape of the sending cams and the speed of the driving motor 1117. The first resetting impulse is transmitted following the operation of relay 1132 and preceding the reoperation of relay 1121. Accordingly, since the reoperation of the relays of the counting chain proceeds as explained in connection with the first operation of the relays, the counting relays 1 to 0 operate immediately following the transmission of the first to tenth restoration impulses, respectively. It will be understood, of course, that relays 1129 and 1130 (9 and 0) count the ninth and tenth resetting impulses, whereas the ninth and tenth restoration impulses were counted by relays 1131 and 1132.

With the digit 0 set up on the price-tens register PT, wherein relays A, B, and D are operated, the energizing potential placed on conductor 1173 through the upper contacts of pick-up relay 1120 is extended through the upper contacts of relay 1130 to the digit-0 conductor, and thence by way of the contacts of the operated relays A, B, and D of the price-tens register PT to conductor 921; with the digit 4 set up on the price-units register PU, the energizing potential on conductor 1173 is extended through the upper contacts of relay 1124 to the digit-4 conductor, and thence by way of contacts of the price-units register PU to conductor 922; and, with the digit 1 set up on the price-fractions register PF, wherein relay D is operated, the energizing potential on conductor 1173 is extended by way of the digit-1 conductor and through contacts of the price-fractions register PF to the units conductor 923. In this way, the energizing potential is supplied to the tens, units, and fractions conductors 921, 922, and 923, and is extended through the tens, units, and fractions conductors 1141, 1142, and 1143 to the upper contacts of the sending cams 1102—1116, enabling the concerned ones of these sending contacts to transmit the resetting impulses to the restored indicators.

*Terminating the fractions digit 1*

When relay 1121 operates, following the transmission of the first resetting impulse, it disconnects the energizing potential from the digit-1 conductor, and consequently from the conductor 923, connected to the apex of the price-fractions register PF, wherein the digit 1 is set up. With the potential disconnected from conductor 923, no potential exists on the supply conductor 1143, and the further operation of the fractions cams 1106 and 1107, 1112 and 1113, and 1116 is ineffective to transmit further fractions impulses. The connected fractions indicators are, therefore, left standing with the digit 1 displayed.

*Terminating the units digit 4*

When the fourth counting relay, 1124, operates following the transmission of the fourth resetting impulse to the indicators, it disconnects the energized conductor 1173 from the fourth digit conductor, thereby disconnecting energizing potential from conductor 922, connected to the apex of the contact pyramid of the price-units register PU, wherein the digit 4 is set up. Disconnecting the energizing potential from conductor 922 removes the energizing potential from conductor 1142, associated with the upper contacts of the units sending cams 1104 and 1105, 1110 and 1111, and 1115. Therefore, no further units impulses are transmitted, and the connected units indicators are left standing with the digit 4 exposed.

*Terminating the price-tens digit 0*

When the tenth counting relay, 1130, operates following the transmission of the tenth resetting impulse, it removes energizing potential from the digit-0 conductor, thereby removing energizing potential from conductor 921, connected to the apex of the contact pyramid of the price-tens register PT, wherein the digit 0 is set up. By this operation, energizing potential is removed from the upper sending contacts of the tens cams 1102 and 1103, 1108 and 1109, and 1114. The connected tens indicators are, therefore, left standing with the digit 0 exposed.

In the foregoing manner, the price digits 0, 4, and 1 have been set up on the last-price indicators shown in Fig. 7.

When relay 1130 operates, all of the resetting impulses have been retransmitted, and the apparatus comprising section 1 of the receiver may be cleared out in a manner to be explained hereinafter.

*Clearing out the common apparatus of the receiver*

When the brush 205 of the distributor leaves the off-normal segment of ring 209 and again encounters the normal segment of this ring, energizing potential is removed from conductor 121 and also from conductor 720, which derives potential from conductor 121, whereupon the locked up relays of the registers SH, ST, SU, and SR all fall back, and the connecting relays 901, 1001, and 1201 energized over conductor 720, restore. The other operations incidental to the brushes 204—207 arriving again in normal position will be discussed subsequently.

*Clearing out section one*

At the end of the resetting operation, relay 1130 of the section-one local sender, Fig. 5, operates and closes a circuit for stop relay 402 at its upper armature. The stop relay 402 operates and locks itself energized at its inner-upper armature through the inner-upper armature of the start relay 401; terminates the action of the local sender by removing energizing potential from conductor 1171 at its lower armature; removes energizing potential from conductor 925 at its middle-upper armature; and at its upper armature removes energizing potential from locking conductor 302, thereby permitting the locked-up register relays of Fig. 3 to restore. When all of them have restored, the energizing potential is removed from start conductor 924, whereupon start relay 401 restores and permits the locked-up stop relay 402 to restore by opening the locking circuit of the latter relay at its inner-upper armature. When relay 402 restores, it replaces locking potential on conductor 302, again preparing locking circuits for the relays of registers PT, PU, and PF.

It is to be noted that the relays 401 and 402 cannot restore to replace this locking potential as long as any one of the register relays of Fig. 3 is operated, because each relay has a pair of contacts for maintaining energizing potential on the start conductor 924 until it falls back. Maintaining energizing potential on conductor 924, however, does not maintain energizing potential on conductor 213, connected to the apexes of the contact pyramids of registers SU and SR, because conductor 213 is disconnected from conductor 924 as soon as relay 901 restores responsive to the distributor brush 205 leaving the off-normal segment of ring 209.

*Action of the distributor between quotations*

In order to insure that the distributor in the receiver will remain in synchronism with the transmitting distributor as nearly as possible, and in order to prevent any slight phase displacement of single revolutions from becoming accumulative, the receiving distributor is normally adjusted to run very slightly faster than the transmitting distributor, so it reaches its normal or start-stop position slightly ahead of the sending transmitter, and is stopped momentarily in normal position, as is well known to those acquainted with start-stop printing-telegraph practice. The transmitting distributor is accordingly arranged to reverse the line current back to normal direction while brush 207 is passing over the dead segment following the final active segment and just preceding the normal segment in ring 211. Therefore, when brush 207 arrives on the normal segment, line relay 101 is in an actuated condition and no energizing circuit exists for start magnet 203. Under this condition, the arm carrying brushes 204—207 is physically restrained by the usual latch mechanism from traveling further, and the brushes 204 to 207 come to rest in normal position. This action is arranged to take place invariably, even though another stock quotation is to follow immediately.

The circuit of relay 110 is opened when energizing potential is removed from conductor 121 upon brush 205 coming again into normal position, but relay 110, being slow-releasing, remains operated between successive quotations of a series because the distributor 200 remains in normal position for only an instant.

Selecting section two

When brush 205 arrives again in normal position and places energizing potential again on conductor 122, it closes a prepared circuit through the upper armature of the now-energized relay 110 for relay 108, whereupon relay 108 operates and closes a locking circuit for itself in series with the upper winding of relay 107, by way of contacts of relays 109 and 110. Relay 107 is not operated at this time, because positive potential is applied to both terminals of its upper winding. It is to be noted that this energizing circuit for relay 108 does not normally exist, because relay 110 is not normally operated, but is operated with the distributor in normal position only immediately following a rotation of the distributor. With relay 108 operated and locked, the sequence control relay group is prepared to select section two of the receiver in case another quotation is received immediately.

Receiving a quotation pertaining to section two

Assuming now that the above-mentioned quotation pertaining to section one is followed immediately by a quotation pertaining to section two, the reversal of line current causes relay 101 to restore and start the distributor 200 again by momentarily operating start magnet 203.

When brush 205 leaves the associated normal segment and removes ground potential from conductor 122, the initial circuit of relay 108 is opened, whereupon relay 107 operates in series with relay 108 and in the locking circuit of the latter relay. Upon operating, relay 107 prepares a holding circuit for its lower winding and an energizing circuit for release relay 109 at its inner armature.

Connecting up section two

With relay 108 now in energized condition, the placing of an energizing potential on conductor 121, in addition to preparing a locking circuit for the register relays of Fig. 2, closes a circuit through the upper armature of the operated relay 108 and over conductor 720' for the connecting relays of section two of the receiver. These connecting relays operate and connect up section two of the receiver for operation, which takes place as explained in connection with section one.

Again selecting section one

When the brushes 204—207 again arrive in normal position, the placing of ground potential on conductor 122 by brush 205 results in the closure of a holding circuit for the lower winding of relay 107 and in the closure of an energizing circuit for release relay 109. Relay 109 thereupon operates and opens the locking circuit of relay 108, whereupon relay 108 falls back and opens an additional point in its locking circuit at its lower armature, at the same time disconnecting relay 109 at its inner-upper armature. Relay 107 remains operated until the distributor 200 again leaves its normal position or until relay 110 falls back, whereupon relay 107 restores.

At its upper armature, relay 108 switches conductor 121 from conductor 720' to conductor 720, thereby predetermining that the next quotation received will be directed to section one of the receiver.

Starting the local sender when no price tens digit is registered

It will now be explained how the local sender is started when no price-tens digit is received. The price-tens digit may be omitted whenever there is no change in the tens digit of the stock quotation, and it may, moreover, be omitted under certain conditions along with the price-units and price-fractions digits when the operator at the transmitting station is resetting the indicators of a stock to blank position.

The special starting circuit now under discussion involves the addition of a special start relay to each section of the receiver. The start relay added to section one is relay 300, Fig. 3, and it has its actuating winding connected by way of contacts of relay 901 and the contacts of any actuated relay of the stock-units register SU to the segment of ring 211 lying between the A and B price-tens segments. The actuating winding of relay 300 is connected to positive potential, obtained from bus-bar 113, instead of being connected to negative or ground potential, obtained from bus-bar 114, as are the actuating windings of the register relays. By this arrangement, in case no price-tens digit is to be set up, and line relay 101 is restored while brush 207 is passing over the segments assigned to the price-tens register PT, a circuit is closed for the right-hand winding of relay 300 (assuming that the instant quotation is one pertaining to section one). Upon operating, relay 300 locks itself to the register-relay locking conductor 302 at its left-hand contacts, and it places energizing potential on start conductor 924 at its right-hand contacts, with the same results as are accomplished when potential is placed on conductor 924 by a register relay.

It will be understood, of course, that relay 300 may become operated, even though a price-tens digit is being set up, in case the digit is one which does not involve either relays A or B of the price-tens register. The operation of relay 300 in conjunction with the relays of the price-tens register PT causes no harmful results. By the described duplex starting arrangement, it is insured that the starting of the local sender is not delayed beyond the point at which relay B of the price-tens register PT is arranged to operate.

In order to prevent unnecessary starting of the local sender by relay 300 when the brushes of the distributor 200 make a revolution at a tmie when no quotation is being received, the circuit for relay 300, Fig. 3, and for the corresponding relay of section two is taken through contacts of the relays of the stock-units register SU. If no quotation is being received, no relay of the register SU is operated, and neither relay 300 nor the corresponding relay of the second section can operate to cause an unnecessary starting of the sender.

Maintaining the receiver and transmitter in step

It has been explained hereinbefore that the transmitter is so arranged that it first transmits a quotation pertaining to section one when it resumes operation after a pause of appreciable length, and that it does so regardless of to which section of the receiver the last transmitted quotation pertained. This arrangement is taken advantage of in order to maintain the receiver in step with the transmitter, as will now be pointed out.

It has been explained that relay 110 is rendered slow-releasing in order to maintain it operated continuously while the quotations are being received without substantial pause between successive ones. When the distributor 200 remains in normal position for a substantial interval, relay 110 falls back because there is no energizing potential on conductor 121. Upon falling back, relay 110 opens a point in the locking circuit of relay 108 at its lower armature, thereby restoring relay 108 in case it is operated.

With relay 108 restored, conductor 121 is connected with conductor 720 so that the next quotation received will be directed to section one because of the energizing potential being placed on conductor 720 instead of on conductor 720'. It will be understood, of course, that relay 108 continues to be operated each time the distributor 200 arrives in normal position following the receipt of a quotation pertaining to section one, and that it continues to be restored each time the distributor arrives in normal condition following the receipt of a quotation pertaining to section two, as long as the quotations follow one another without appreciable pause.

In practice it may be arranged so that the sending of quotations is regularly stopped periodically for a long enough time to permit relay 110 to fall back. By this arrangement, in case the sequence-control relays 107—109 should be out of step, the proper sequence is restored when relay 110 falls back.

It may be pointed out that the distributor 200 may be caused to make a revolution without recording a quotation if desired; as, for example, when a quotation for section two is stored and it is desired to send this quotation without waiting for quotation for section one. In this case, the transmitter is arranged to reverse the line current and cause the distributor 200 to make a complete revolution while the line current remains reversed, in which case no register relays are operated, because the line relay 101 is not reoperated until the distributor 200 arrives again in its start-stop position. It is to be noted, however, that the sequence-control relays 108 and 107 operate in the usual manner, and relay 108 disconnects conductor 720 and connects up conductor 720' when the brushes again arrive in normal position, preparatory to the receipt of the quotation for section two.

Operation of the printer

It is to be noted that a printer, indicated by the rectangle 212, is connected to certain segments in ring 211 not needed for operating register relays. There are five such segments connected to the printer, enabling one letter of a message to be recorded on the printer each time the distributor 200 makes a revolution. This message may be sent out by the transmitter along with stock quotations, or it may be sent separately at a time when no quotations are being transmitted. The message sent out and printed on the printer may be intended for an attendant or repairman at the receiver, who may connect up the printer when he is on duty at the receiver and disconnect it when he is through.

Setting up the previous closing price

At the close of the day, the quotations set up on the stock indicators at the indicator boards are wiped out, and the last price of the day for each stock is set up as the previous closing price, so that it will show on the indicating boards when business is resumed on the next business day.

In order that the tens, units, and fractions digits of the closing price (as indicated by the last-price indicators) be set up on the tens, units, and fractions indicators of the previous-close group (PC), a suitable quotation is received containing a stock-range digit 8. If this is a section-one quotation, the energization of the digit-8 range conductor by stock range register SR results in the closure of a circuit, through contacts of connecting relay 1201 for the previous close (PC) relay 1206.

When this relay operates, it connects up the conductors extending to the tens, units, and fractions registers in the previous-close group, resulting in the restoration and resetting impulses being transmitted to these registers to set up the tens, units, and fractions digits of the previous closing price.

In case the hundreds digit of the previous closing price differs from the hundreds digit already set up on the hundreds indicator of the previous-close indicator-group, or row, the new hundreds digit is received as a separate quotation. The quotation digits are received as before, resulting in the appropriate stock being selected in the hereinbefore described manner. In the stock-range register SR, the energization of relay B results in the associated digit-7 conductor being rendered effective, operating the previous-close hundreds relay 1205 by way of contacts of relay 1201. When relay 1205 operates, it connects up only the hundreds indicator of the selected stock group, resulting in the hundreds indicators of the row PC on the main board MB and the auxiliary board AB being set in accordance with the digit now set up on the price-tens register PT. The tens, units, and fractions registers of the previous-close group are not affected, as they are not connected up by relay 1205.

In this way, the register PT of Fig. 3 is made to serve as the hundreds register, or as a tens register, depending upon the setting of the register SR, Fig. 2.

Clearing out the open, high, low, and last prices

In order to clear out the open, high, low, and last prices for any given stock, stock BBA for example, a quotation is received containing the digit blank for each of the registers PT, PU, and PF, while the range digit is a 9. In the registers PT, PU, and PF, the receipt of the price-digit blank results in the operation of relay A alone. With relay A alone operated in each of the registers PT, PU, and PF, the apex conductors 921, 922, and 923 are all maintained disconnected from the digit conductors 1 to 0, thereby preventing the transmission of any resetting impulses to the tens, units, and fractions indicators in the selected stock group and stock-range groups.

The operation of relay C in the stock-range register SR results in the associated digit 9 conductor being energized, closing a circuit through contacts of relay 1201 for the unison relay 1204. Relay 1204 prepares the usual locking circuit for itself at its inner-upper armature, at the same time closing circuits for the open, high, low, and last range relays 1207, 1208, 1209, and 1210. Relays 1207—1210 are accordingly operated to connect up the tens, units, and fractions conductors 1226—1236 and 1241—1252, extending to the tens, units, and fractions indicators in ranges open, high, low and last of the selected stock on the main board MB and the auxiliary board AB. The last-price relay 1210 also connects up the tens, units, and fractions conductors 1253—1255 extending to the last-price indicators of the executive board EB.

With the stock-range relays 1207—1210 operated, and with the above-mentioned conductors connected up, the series of restoration impulses is transmitted to all indicators of the selected stock groups, with the exception of the indicators in the top row on the main and auxiliary boards, restoring the open, high, low, and last indicators to blank position. Now, since conductors 921—923 are not connected in the registers PT, PU, and PF, as above pointed out, no resetting impulses are transmitted when the section-one local sender goes through its resetting impulse-counting operation, and the above-mentioned indicators are left standing in blank position.

The foregoing operation of setting up the last price of the day as previous closing price and of then restoring the open, high, low, and last indicators is repeated for each of the stocks, thereby preparing the indicator board for the opening of the next business day.

*First quotation of the day; open, high, low and last*

When the first quotation of the day is to be set up for any stock, it is to be set up as the opening price, as the high price, as the low price, and as the last price. As a result, the first price of the day contains the unison range digit 9.

The receipt of the unison stock-range digit 9 on the stock-range register SR results in the energization of the unison relay 1204, causing relays 1207—1210 to operate as hereinbefore described to connect up the open, high, low, and last indicators. As a result, the price digits set up on the registers PT, PU, and PF of Fig. 3 are transmitted to these indicators, setting up the first received price for the stock in question as the open, high, low, and last price.

*Low-last quotation*

In case a subsequent quotation is the lowest so far received for a particular stock, it should be set up as the low price, in addition to being set up as the last price. In order to bring this about, one range digit or two range digits are received on register SR, depending upon whether the quotation contains a new tens digit or not. In one case the low-last range digit 1 is received alone, while in the other case the range digits 1 and 0 are both received. The relays A, B, and D, or relays A, B, C, and D, as the case may be, of the stock-range register SR are operated to set up the digit 1 or the digits 1 and 0. In response to the digit 1 being set up on the stock-range register SR, the low-last range relay 1202 is operated to close circuits for the low and last range relays 1209 and 1210. These two relays are operated to connect up conductors 1231—1236 and 1247—1255, to cause the digits set up on the registers of Fig. 3 to be transmitted to the low- and last-price indicators of Fig. 7.

In case the range digit 0 is not set up, relay 1118 is not operated, and the tens indicators in the affected range group are restored and reset, along with the units and fractions indicators. On the other hand, if the range digit 0 is set up along with the digit 1, owing to relay C of the stock-range register SR being operated, relay 1118 of Fig. 7 is operated to prevent the restoration and resetting of the tens indicators.

*High-last quotations*

When the price digits of a quotation are to be set up as the high price of the day, in addition to the last price, the quotation contains range digits 2 and 0, or the range digit 2, causing the operation of high-last relay 1203, and relay 1118, or relay 1203 alone. Relay 1203 operates the high-price relay 1208 and the last price relay 1210, causing the quotation to be set up as the high price and as the last price.

*Other quotations*

A quotation may be received as the high price or as the low price, in units and fractions or in tens, units, and fractions, operating either of the relays 1208, or 1209, either alone or in conjunction with relay 1118.

*Controlling the motor-generator MG*

Arrangements are made for controlling the starting and stopping of the motor-generator MG over the line from the transmitting station. The stopping of the motor generator is accomplished by restoring the line relay for a long enough interval to permit the motor-control relays to open the motor circuit. Since the line relay is sometimes restored for as long as a complete revolution of the distributor during normal operation of the system, and may occasionally be restored for perhaps two revolutions under abnormal conditions, it is found that one or two slow-acting relays do not give proper timing in the present system. The motor-control relays of Fig. 1, therefore, have been arranged to count the operations of the distributor, as indicated by the operation of the sequence-control relays, and to shut down the motor-generator only after the distributor has made three revolutions with the line relay continuously restored.

During normal operation, relay 102 is operated each time the line relay 101 operates, and it opens the locking circuit of relays 104 and 105 to prevent false operation of the motor-stop relay 106. Relay 102 locks itself energized whenever relay 104 is operated, and does not fall back until relay 104 falls back and opens the locking circuit.

*Stopping the motor-generator*

When it is desired to shut down the receiver at the close of the business day, the line current is reversed, causing the deenergization of relays 101 and 102, following which the line current may be discontinued as shown in the Robinson et al, application. With relay 101 deenergized, start magnet 203 is operated and the distributor 200 is started and makes a revolution as pointed out hereinbefore. Relay 102 prepares a locking circuit for relays 104 and 105 at its lower armature. Ordinarily, line relay 101 is reoperated to stop the distributor momentarily when the normal position is again reached, and relay 102 is reoperated to open the locking circuits of relays 104 and

105. Under the present circumstances, however, relay 101 is not reoperated when the distributor 200 again arrives in normal position, and start magnet 203 is immediately reoperated to start the distributor on another revolution, while relay 102 remains unactuated. With relay 102 in normal position, the energization of relay 104 through the contacts of sequence control relay 108 at the end of the first revolution results in relay 104 locking itself in series with relay 105 at its lower armature and through the lower armature of the now-restored relay 102. Relay 105 does not operate for the time being, however, because it is supplied with the same potential at both terminals.

As soon as relay 108 is restored by relay 109 at the end of the second revolution, the initial circuit of relay 104 is opened, whereupon relay 105 energizes in series with relay 104, preparing a circuit for relay 106.

With relay 105 operated, relay 106 operates as soon as the distributor 200 again arrives in normal position and reoperates relay 108. Upon operating, relay 106 locks itself energized through its lower contacts of relay 102 at its inner armature, and at its lower armature it opens the circuit of the magnet of the starter S. When this circuit is opened, the starter S opens the circuit to the motor-generator MG, whereupon the motor generator starts to slow down and come to a stop.

When the motor-generator has slowed down sufficiently to permit the voltage across the bus-bars 113 and 114 to be reduced somewhat, relay 103, which has a heavier spring load than relay 106, falls back and opens another point in the circuit to the starter S at its inner and middle armatures, while at its lower armature it opens the circuit of the motor 201 of the distributor.

After the voltage across the bus-bars 113 and 114 has dropped to a still lower value, relays 104, 105, and 106 fall back, as do any actuated ones of the relays 107—110. Relay 106 against prepares a circuit for the starter S, but the circuit is not again closed because relay 103 has fallen back, as above pointed out, and relay 101 is in a deenergized condition.

*Starting the motor-generator*

In order to start the receiver into operation at the beginning of the business day, a current flow is established over line conductor 100 in normal direction, thereby operating line relay 101 to close a circuit from the commercial power leads 115 and 116 through contacts of the deenergized relay 103 and the deenergized relay 106 for the starter S. The starter S, thereupon operates and closes a circuit for the motor of the motor-generator MG, starting the motor-generator into operation.

When the potential has been built up across bus-bars 113 and 114 to a substantial value, relays 102 and 103 operate, and relay 103 completes a circuit for the starter S independent of the lower contacts of line relay 101, at the same time disconnecting them from the commercial current leads. At its lower armature, relay 103 closes a circuit over conductors 124 and 125 for the motor 201 of the distributor 200, starting this motor into operation.

The motor employed to operate the impulse-generating cams pertaining to the local senders is connected directly across the bus-bars 113 and 114, and does not, therefore, need any special starting and stopping arrangement. If desired, the motor 201 of the distributor may be similarly operated, in which case it must be wound to operate at the voltage of the bus-bars 113 and 114 instead of at the higher voltage of the commercial power leads.

What is claimed is:

1. In a stock-quotation receiving station for use in a stock-quotation system, two groups of register relays arranged to register stock-quotation digits, and sequence control means responsive each time a stock quotation is received for directing digits of the first stock quotation of a series to the first of said groups of register relays and for directing digits of each subsequent stock quotation of the series to either of said groups of register relays, depending on the spacing between such quotations and the preceding quotations.

2. In a stock-quotation receiving station for use in a stock-quotation system, two groups of register relays for registering stock-quotation digits, sequence control means responsive each time a stock quotation is received for directing digits of each odd-numbered stock quotation of a series to the first of said groups of register relays and for directing digits of each even-numbered stock quotation of a series to the other of said groups of register relays, and means automatically effective whenever there is a pause of more than a predetermined length separating two quotations for selecting the first of said groups of register relays to respond to the next succeeding quotation, regardless of which group of register relays responded to the one last received.

3. In a stock-quotation receiver, means including register relays for recording digits of a stock quotation, means including a sending device operable under the control of said register relays to set up the registered digits on indicators, means for starting said sender into operation responsive to the operation of any one of a predetermined number of said register relays, means including an additional relay for starting the operation of said sender when it operates, and means for operating said additional relay when neither of certain ones of the last-named register relays operates.

4. In a stock-quotation receiver, a plurality of relays arranged to register digits in a stock quotation, a local sender arranged to transmit impulses under the control of said register relays, said local sender having a start relay and a stop relay associated therewith, contacts on each of said register relays arranged to close a locking circuit for the associated relay when the relay operates, said locking circuit in each case including normally-closed contacts of said stop relay, another pair of contacts on each of said register relays for closing a circuit for said start relay, each operated register relay closing a separate circuit for the start relay, means for starting said local sender into operation responsive to the operation of said start relay, means for operating said stop relay responsive to said local sender reaching a predetermined point in its operation, whereby all operated ones of said register relays are unlocked and restored, and a self-locking circuit for said stop relay including normally open contacts of said start relay for maintaining said stop relay operated to maintain the locking circuits of the register relays open until the last of them has restored.

5. In combination, a group of self-locking relays, means for operating said relays, a contact pair on each relay effective when the relay is operated to close a self-locking circuit to hold the relay in operated position, an additional relay, the locking circuits of all said register relays including normally-closed contacts on said additional relay, means for operating said additional relay to open all said locking circuits and restore all operated ones of said register relays, and means including additional contacts on each of said self-locking relays for maintaining said additional relay operated until all of said self-locking relays have restored.

6. In a stock-quotation system employing a revolving distributor to distribute the impulses corresponding to the stock quotations, a group of stock-digit register relays, a group of price-digit register relays, said distributor being arranged to move from a starting position and having sufficient segments to close circuits for all of said relays successively to enable them to be operated before the distributor again returns to its start position, a local sender, means for operating said sender under the control of said price-digit relays, a self-locking circuit for said stock-digit register relays energized upon said distributor leaving its start position and deenergized when said distributor again returns to its start position, and a self-locking circuit for said price-digit register relays energized and deenergized under the control of said local sender.

7. In a stock-quotation receiving station for use in a stock-quotation system, two groups of register relays arranged to register stock-quotation digits, sequence-control means responsive each time a stock quotation is received for directing digits of each odd-numbered stock quotation of a series to the first of said groups of register relays and for directing digits of each even-numbered stock quotation of a series to the other of said groups of register relays, a generating device at the receiver for supplying operating current thereto, and means controlled by said sequence-control means for stopping the generating device when no further quotations are to be received.

8. In a stock quotation receiver composed of two register sections, a motor-driven distributor for distributing the received impulses of a stock quotation to the register apparatus, sequence-control means responsive each time a stock quotation is received for associating the distributor with the other section while the next succeeding quotation is being received, whereby received stock quotations are impressed on said sections alternately, and means controlled by said sequence-control means for disconnecting power from the driving motor of the distributor when no more quotations are to be received.

HAROLD C. ROBINSON.